Figure 1:
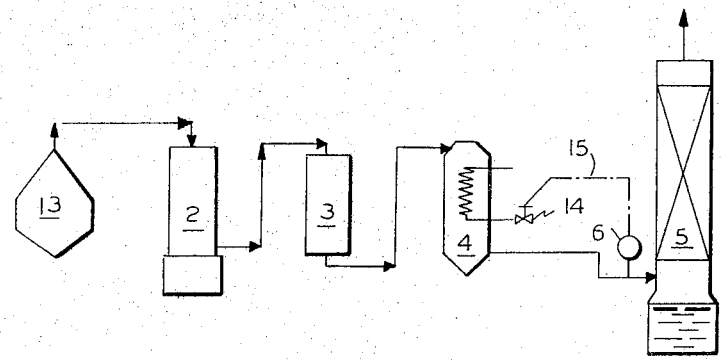

3,307,904
PREPARATION OF NITROSYLSULFURIC ACID OF HIGH PURITY

Ryoichi Ysuda, Fumio Nishikawa, and Takao Iwamura, Minami-ku, Nagoya, Japan, assignors to Toyo Rayon Kabushiki Kaisha, Tokyo, Japan, a corporation of Japan Filed Dec. 26, 1962, Ser. No. 247,001
Claims priority, application Japan, Dec. 26, 1961, 36/47,444
2 Claims. (Cl. 23—139)

This invention relates to a method of preparing nitrosylsulfuric acid with advantage and effectiveness on a commercial scale by regulating the composition of the mixed gas of nitrogen monoxide and nitrogen peroxide in the method of preparing nitrosylsulfuric acid from the mixed gas of ntirogen monoxide and nitrogen peroxide obtained by oxidizing ammonia, the composition being regulated so as to be particularly favorable for the preparation of nitrosylsulfuric acid by regulating the cooling temperature of said mixed gas. More particularly, the invention relates to a method of preparing nitrosylsulfuric acid of high purity which comprises oxidizing ammonia to obtain a mixed gas of nitrogen monoxide and nitrogen peroxide, cooling this mixed gas positively, the temperature of the aforesaid mixed gas being regulated at the end of the cooling zone of said positively effected cooling so that the nitrogen monoxide and the nitrogen peroxide of said mixed gas will be maintained substantially equimolar at the time of contact of said mixed gas with a sulfuric acid portion, and thereafter reacting said mixed gas with said sulfuric acid portion.

For obtaining nitrosylsulfuric acid of high purity with advantage and effectiveness commercially, it is especially desired that the mole ratio of nitrogen monoxide to nitrogen peroxide be made substantially equimolar in reacting an oxide of nitrogen with a sulfuric acid portion such as sulfuric acid, fuming sulfuric acid, a sulfuric acid solution of nitrosylsulfuric acid and the like.

The reason for this is because in the formation of nitrosylsulfuric acid by means of the reaction of a mixed gas of nitrogen monoxide and nitrogen peroxide with a sulfuric acid portion, besides the main reaction of the following Equation 1, namely (1)   $NO + NO_2 + 2H_2SO_4 = 2HNOSO_4 + H_2O$ 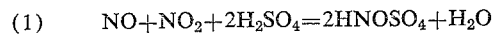

there is set up a side reaction as represented by the following Equation 2 owing to the presence of nitrogen peroxide in excess, namely (2)   $2NO_2(\text{or } N_2O_4) + H_2SO_4 = HNOSO_4 + HNO_3$ 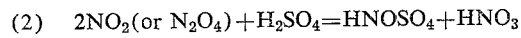

In consequence, in the case of an excess of nitrogen peroxide, the production and the adulteration by by-products, particularly the troublesome nitric acid, cannot be avoided. On the other hand, when nitrogen monoxide is in excess, the reaction of Equation 1, above, cannot be completely carried out.

And the velocity at which the $NO + NO_2$ diffuses through an inert gas is the velocity controlling step for the preparation nitrosylsulfuric acid.

An even more important fact is that in case of gases resulting under usual conditions in oxidizing ammonia the rate at which NO is oxidized and becomes $NO_2$ is slower than the rate of absorption of $NO + NO_2$ into the sulfuric acid portion in the packed tower process. Hence, the NO, not being absorbed by the sulfuric acid, is discharged to the outside of the tower along with the inert gas and results in the loss of the effective nitrogen. Thus, in preparing ntirosulfuric acid by oxidizing ammonia and obtaining a mixed gas of nitrogen monoxide and nitrogen peroxide and then reacting said mixed gas with a sulfuric acid portion, it becomes an indispensable condition for obtaining nitrosylsulfuric acid of high purity with advantage and effectiveness commercially that the nitrogen monoxide and the nitrogen peroxide in the gas composition obtained by oxidation of ammonia is in the neighborhood of equimolarity.

In the past, for the purpose of controlling the presence of nitrogen monoxide and nitrogen peroxide to a certain mole ratio a method has been proposed of changing the oxidizing atmosphere whereby nitrogen monoxide is oxidized to nitrogen peroxide, by the direct introduction of an oxygen-containing gas such as air or oxygen. The rate of oxidation of the nitrogen monoxide can be enhanced by raising the partial pressure of oxygen in the mixed gas by the introduction of this oxygen-containing gas. On the other hand, owing to the fact that the partial pressure of the nitrogen sesquioxide present in the mixed gas falls, and in consequence that the rate at which the mixed gas reacts with the sulfuric acid portion drops and that such a drop must be compensated by an increase in the size and complication of the absorption apparatus, there are brought about disadvantages from the commercial standpoint in that it is impossible to avoid the operations from becoming troublesome and the apparatus from becoming complicated, it still being difficult to fully compensate for this drop in the reaction rate even though these measures are taken. In addition, there is also the disadvantage that a source of oxygen to be introduced together with its introduction apparatus as well as introduction operations would become necessary.

As a result of our researches for a method of preparing nitrosylsulfuric acid from the mixed gas obtained by the oxidation of ammonia, which would overcome the technical defects of the proposals made heretofore and from the standpoint of equipment requirements and operation be advantageous and effective commercially, we found that nitrosylsulfuric acid could be prepared satisfactorily by merely regulating the cooling temperature of the mixed gas without introducing such an oxygen-containing gas. In addition, despite the fact that the control of the mole ratio with constancy that was industrially practical was considered hereofore to be absolutely difficult of achieving by merely regulating the cooling temperature of the mixed gas on account of the complexity of the equilibrium relationships between the nitrogen monoxide, nitrogen peroxide and other oxides of nitrogen contained in the mixed gas of nitrogen monoxide and nitrogen peroxide obtained by oxidizing ammonia, surprisingly it was found that by regulating the temperature of the mixed gas particularly at the end of the cooling zone when positively cooling said gas, the control of the mole ratio was made possible on a commercial scale, thereby making possible the preparation of nitrosylsulfuric acid commercially with great advantage.

Accordingly, it is an object of the present invention to provide a method of preparing nitrosylsulfuric acid very advantageously and effectively commercially, the preparation thereof being carried out while very easily regulating the proportion of the nitrogen monoxide and nitrogen peroxide contained in the mixed gas obtained by oxidizing ammonia, such that they are contained in equimolar quantities.

Another object of the invention is to disclose a method of controlling the proportion of composition of the nitrogen monoxide and nitrogen peroxide for carrying out such a method advantageously and thus make known a very advantageous and effective method of preparing nitrosylsulfuric acid commercially.

Other objects and advantages of this invention will become apparent from a description thereof which follows:

According to the present invention, ammonia is oxidized to obtain a mixed gas of nitrogen monoxide and nitrogen peroxide, which mixed gas is then positively cooled, the temperature of the aforesaid mixed gas being regulated at the end of the cooling zone of said positively effected cooling so that the nitrogen monoxide and the nitrogen peroxide of said mixed gas will be maintained substantially equimolar at the time of contact of said mixed gas with the sulfuric acid portion, and thereafter said mixed gas is reacted with a sulfuric acid portion.

On the other hand, in such a case as the preparation of nitric acid, as it is permissible to convert substantially all of the nitrogen monoxide contained in the mixed gas to nitrogen peroxide, a regulated cooling as in the present invention is not necessary.

The usual cooling means such as by water, brine, etc. can be conveniently applied to this invention and normally it is usually advisable to effect the cooling by passage of the mixed gas through two or more cooling zones. If the regulatory cooling takes place immediately prior to the zone in which reaction with the sulfuric acid portion is to be carried out or in the vicinity of the entry to the cooling zone, the objects which this invention intends to attain would be substantially lost so as to render it practically impossible to achieve the control of the mole ratio with regularity on a commercial basis. Furthermore, the equimolarity between the nitrogen monoxide and the nitrogen peroxide must be maintained at substantially the time when the mixed gas and the sulfuric acid portion make contact. In addition, it is necessary that the regulation of the temperature of the mixed gas at the end of the cooling zone be carried out in response to the fluctuations in the aforesaid mole ratio in the mixed gas at the time of this contact. Therefore, in accordance with the present invention, particularly preferred is the technique which comprises passing the aforesaid mixed gas through two or more successive cooling zones, detecting the mole ratio at the entry to the zone of contact of the aforesaid mixed gas with the sulfuric acid portion, and regulating in response thereto the temperature of said mixed gas at the outlet from the final one of the aforesaid cooling zones.

The detection of the mole ratio is carried out by the conventional techniques of chemical analysis and colorimetry, it being convenient to utilize the visible ray absorption characteristics of nitrogen peroxide. It is usually advisable to provide the detection end at that part where the mixed gas is introduced into the absorption apparatus for contacting said mixed gas with the sulfuric acid portion. In this manner, the mole ratio of the nitrogen monoxide to nitrogen peroxide in the mixed gas at the time of contact is continuously or intermittently detected, and with the temperature of the mixed gas at the end of the cooling zone being regulated in response thereto the mole ratio of the nitrogen monoxide to nitrogen peroxide at the time of contact of the mixed gas with the sulfuric acid portion is maintained substantially equimolar. The regulation of the temperature of the mixed gas is satisfactorily carried out by lowering the temperature of the cooling zone end when the mole ratio inclines to the nitrogen monoxide side and on the other hand raising said temperature when the inclination is to the nitrogen peroxide side. While the foregoing temperature regulation can be carried out by manual means, it is more conveniently carried out by an automatic control system which automatically controls the mixed gas temperature in accordance with the detection results of the mole ratio obtained at the detection end. Although the relationship between the detection results and the regulating temperature will differ depending upon such as the dwell time of the gas, heat loss, etc. at that part where the mixed gas passes between the end of the cooling zone and the absorption apparatus, it can be readily determined experimentally for each plant as a relationship peculiar thereto. It is exceedingly difficult to effect such a control at locations other than at the end of the cooling zone.

The oxidation reaction in which nitrogen monoxide is converted to nitrogen peroxide is a secondary reaction in which partial pressures of oxygen and of nitrogen monoxide are involved. And this being an exothermic reaction the heat radiation at that part where the mixed gas passes cannot be ignored. Thus, to obtain the mole ratio of the mixed gas after a certain dwell time merely by means of calculation is extremely difficult due to the fact that this conversion reaction is very irregular with respect to temperature as well as the complexity of the factors controlling the reaction.

The foregoing fact is one of the reasons why, in preparing nitrosylsulfuric acid by reacting a mixed gas of nitrogen monoxide and nitrogen peroxide with a sulfuric acid portion, it could not be presumed that it would be possible to achieve substantial equimolarity in the mole ratio of nitrogen monoxide to nitrogen peroxide that would be satisfactory from the commercial standpoint by merely regulating the temperature of the mixed gas during its cooling; much less could it ever have been possible to presume that such a control could be achieved by its merely being carried out at particularly the end of the cooling zone.

According to this invention, it becomes entirely unnecessary to introduce an oxygen-containing gas as has been proposed hitherto for changing the mole ratio, and since the mole ratio of the nitrogen monoxide to nitrogen peroxide at the time contact of the mixed gas is had with the sulfuric acid portion can very readily be made substantially equimolar, it becomes possible to obtain in high yield nitrosylsulfuric acid of high purity.

Further, it is also possible, if necessary, according to the invention to provide a by-pass in the passage of the mixed gas, thus while adding a means of controlling the volume of the mixed gas flowing through the passage to thereby regulate the temperature of said gas. Needless to say, a change in the passage is merely an auxiliary means, and the objects of the invention cannot be attained by merely effecting a change in the passage. By such an auxiliary means, the composition of the gas is made to approach to a certain extent that intended, and together with the regulation of the gas temperature the intended composition can be maintained.

For a clearer understanding of the invention, several embodiments thereof will be described in further detail by means of the following examples, reference being had to the accompanying drawings. It is to be understood these examples are merely in illustration and not in limitation of the invention.

Figure 2:
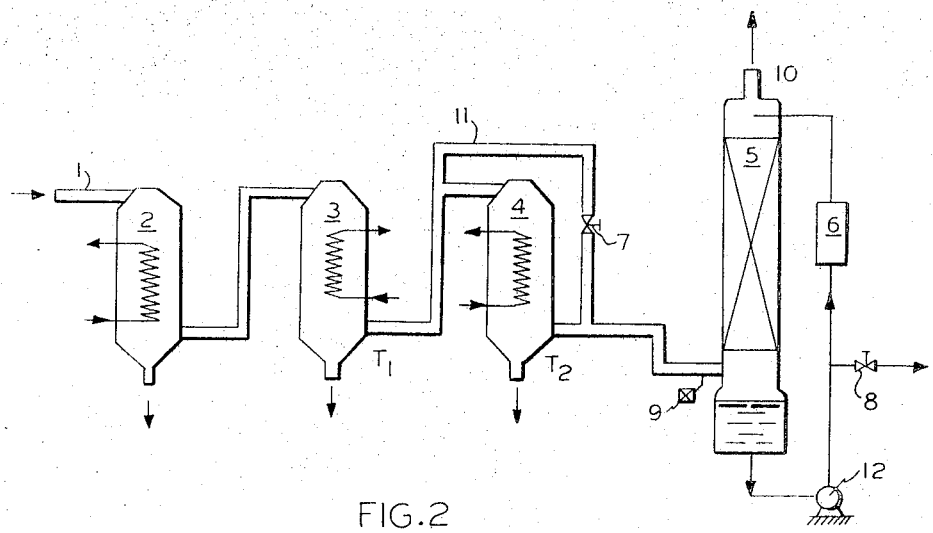
Figure 3:
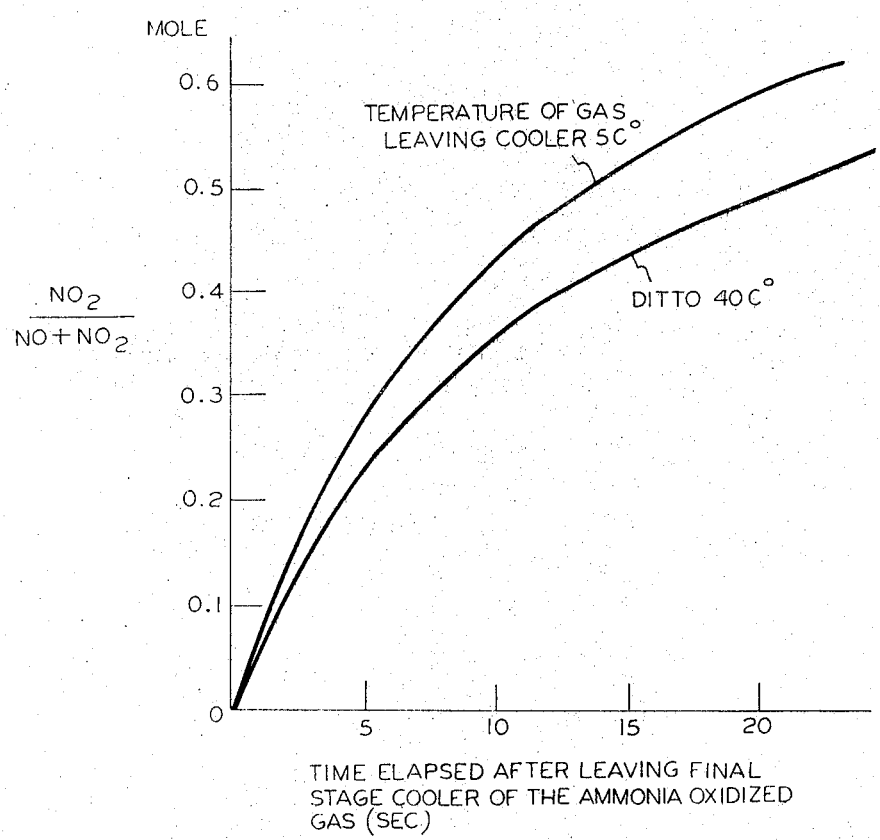

FIG. 1 of the accompanying drawings is a schematic layout view illustrating one example of an equipment in which an ammonia oxidation apparatus and a nitrosylsulfuric acid preparation apparatus are connected together. FIG. 2 is a similar schematic layout view showing another embodiment of an equipment suited for practicing the method of the present invention. FIG. 3 is a graph illustrating the relationship between the reaction times at the temperatures of 5° C. and 40° C. of the mixed gas and the mole ratio of nitrogen monoxide to nitrogen peroxide.

*Example 1*

When there is ample room between the ammonia oxidation apparatus 13 and the nitrosylsulfuric acid preparation apparatus 5, there is allowed in advance sufficient reaction time in the connecting path between the two apparatuses such that the mole ratio of the nitrogen monoxide to nitrogen peroxide in the oxidized gas becomes about equal, and by affecting the regulation of that within the narrow range in the neighborhood of equimolarity by regulating the temperature of the gas that issues from the gas cooler 4 positioned at the final stage of the cooling zone after passing through the cooling towers 2 and 3, i.e., at the end of the cooling zone, the objects of the invention are achieved. In order to decide the reaction time in advance, the equipment is designed after having forecasted the cooling temperature of the gas cooler positioned in the final stage. A regulating valve 14 of the coolant is connected with a densitometer 6 by means of a coupling system 15 and is adapted to automatically regulate the temperature of mixed gas at the end of the cooling zone in accordance with the mole ratio of the mixed gas. Employing the equipment shown in FIG. 1, a mixed gas comprising ammonia in a concentration of 11.5% by volume and 88.5% by volume of air was oxidized in the presence of a platinum-rhodium catalyst thereby obtaining an oxidized mixed gas containing nitrogen monoxide and nitrogen peroxide. FIG. 3 shows the calculation of mole ratios of nitrogen monoxide to nitrogen peroxide of the so obtained mixed gas in relation to the temperatures of the gas at the end of the cooling zone and the reaction times, the conditions in this case being that the pressure was atmospheric and the outside temperature, 10° C. Thus, by employing the equipment shown in FIG. 1 and the above-described oxidized mixed gas it was possible to carry out the method of this invention satisfactorily while maintaining the mole ratio substantially equimolar during the operation and thus prepare in high yield nitrosylsulfuric acid of high purity.

*Example 2*

An oxidized mixed gas, after having been removed of part of its heat by passing through a waste heat boiler, was, as shown in FIG. 2, passed via pipe 1 to a first stage cooler 2 where it is cooled. This first stage cooler which uses water as its coolant cooled the oxidized mixed gas to about 50° C. The gas was then conducted to a second stage cooler 3 employing brine, and the temperature of the gas issuing from its outlet was regulated. In this embodiment a regulating means which utilizes a bypass 11 and valve 7 for controlling the volume flowing through the passage for the mixed gas is used together with a cooler 4. Hence, in this embodiment, the cooling zone ends are $T_1$ and/or $T_2$.

The mixed gas which has left the aforesaid cooler 3 is introduced into the third stage volume-controlling cooler 4. The cooler 4 has in its gas passage a by-pass 11, and the gas which has passed this portion after being controlled by a suitable method, as described hereinafter, is measured for its composition by means of a gas composition detection device 9 provided at the entry to an absorption tower 5. The technique by which the gas composition is controlled is as follows: As regards the gas which has issued from the cooler 3, the quantity thereof that passes through cooler 4 is determined by the degree of opening of valve 7. The mixed gas whose composition has approximately approached the end intended by means of the volume of the gas passed and its temperature at the outlet from cooler 3, by being further regulated as to its temperature at the outlet of cooler 4 can attain its finally intended composition.

The foregoing operations can be carried out completely automatically by coupling with a detection device. Alternatively, since there is no necessity for constantly changing the degree of opening of valve 7, it is also possible to automatize only the regulation of the temperature and manually operate the rest. It must be noted here that the temperature $T_2$ at the outlet of cooler 4 is decided after the temperature $T_1$ at the outlet of cooler 3 and the degree of opening of the valve 7, i.e., the volume of gas passing through cooler 4, is decided, and these are used for deciding on the final adjustment of the gas composition.

The thus obtained mixed gas of the oxides of nitrogen having the intended composition enters the absorption tower 5 and is absorbed by the cycling sulfuric acid to thereby form nitrosylsulfuric acid of high purity, which is then taken out via valve 8. The spent gas in this instance is discharged from a discharge pipe 10. In this same figure, 6 is the filter and 12, the cycling pump.

By doing as above, it was possible to prepare nitrosylsulfuric acid of high purity in good yield and conveniently by regulating the temperature of the mixed gas in response to the detection results of a gas composition detection device 9 and while controlling the volume of the mixed gas in its passage.

What is claimed is:
1. A method of preparing nitrosylsulfuric acid of high purity which comprises oxidizing ammonia to obtain a hot mixed gas of nitrogen monoxide and nitrogen peroxide, cooling the said mixed gas positively by passing the same through at least two successive cooling zones, regulating the temperature of the mixed gas at the end of the final cooling zone wherein the nitrogen monoxide and nitrogen peroxide mixed gas at the time of its contact with a sulfuric acid portion will be maintained substantially equimolar, said temperature regulation being carried out in response to fluctuations in the mole ratio of the mixed gas, and thereafter reacting said mixed gas with said sulfuric acid portion and recovering the nitrosylsulfuric acid.

2. The method according to claim 1 wherein in addition to regulating the temperature of said mixed gas, the volume thereof in its passage is regulated in response to the fluctuation in said mole ratio.

References Cited by the Examiner

UNITED STATES PATENTS 2,450,105   9/1948   Batchelder et al.

FOREIGN PATENTS 647,594   12/1950   Great Britain.

OTHER REFERENCES

Mellor, A Comprehensive Treatise on Inorganic and Theoretical Chemistry, vol. 8, Longmans, Green and Co., New York, 1928, page 373.

OSCAR R. VERTIZ, *Primary Examiner.*

MILTON WEISSMAN, *Examiner.*

H. T. CARTER, *Assistant Examiner.*